Feb. 21, 1928.
A. ROHRBACH
AIRCRAFT
Filed Nov. 7, 1925
1,659,961
2 Sheets-Sheet 1
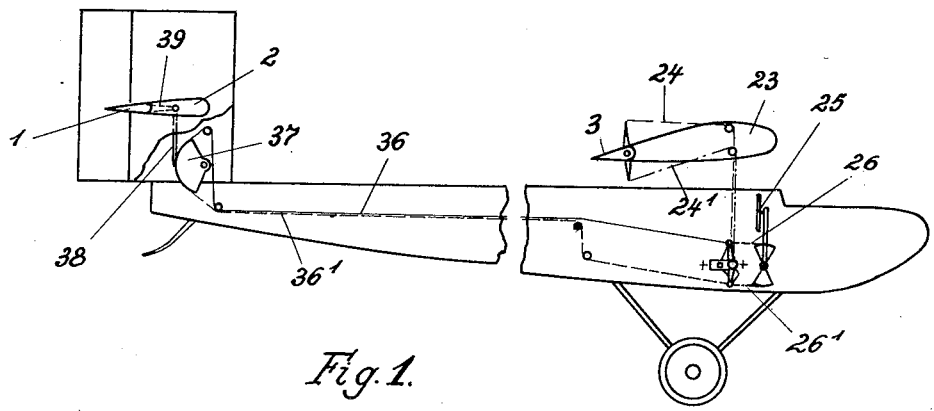
Fig.1.
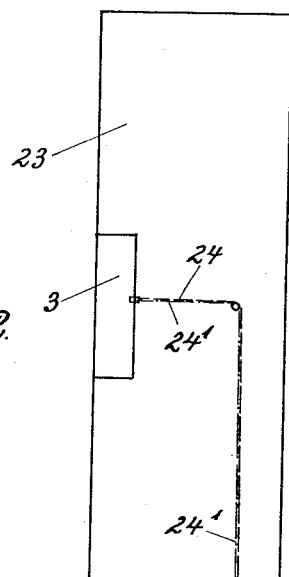
Fig.2.
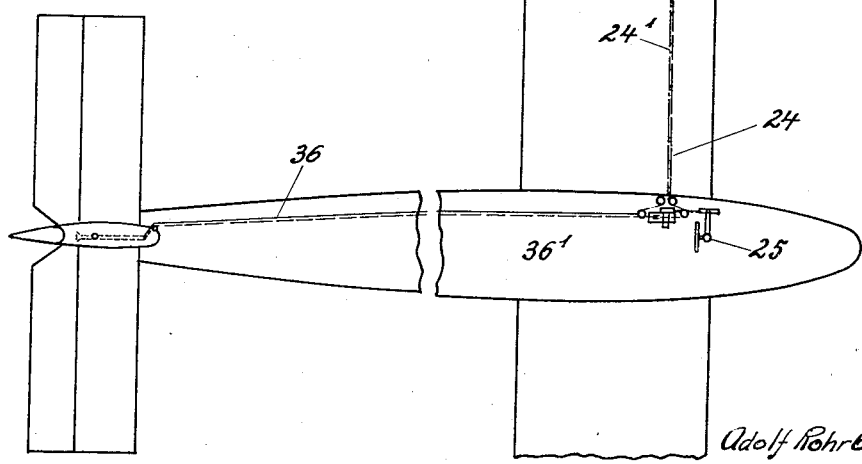
Adolf Rohrbach
By Chas. H. Keel
Attorney.

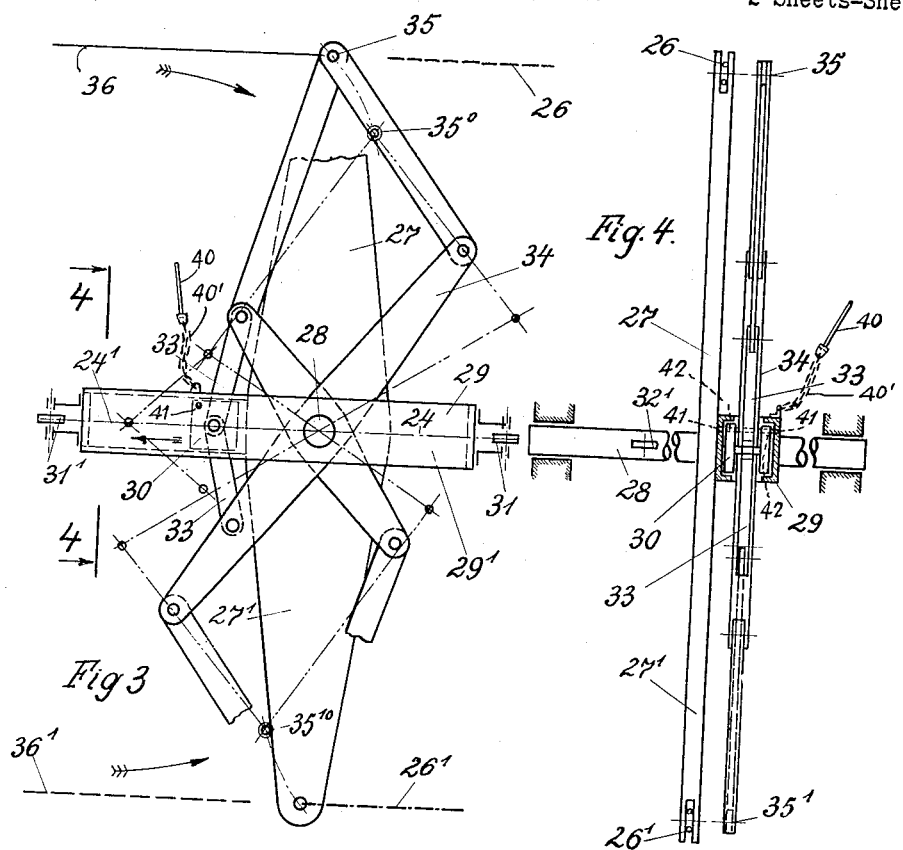
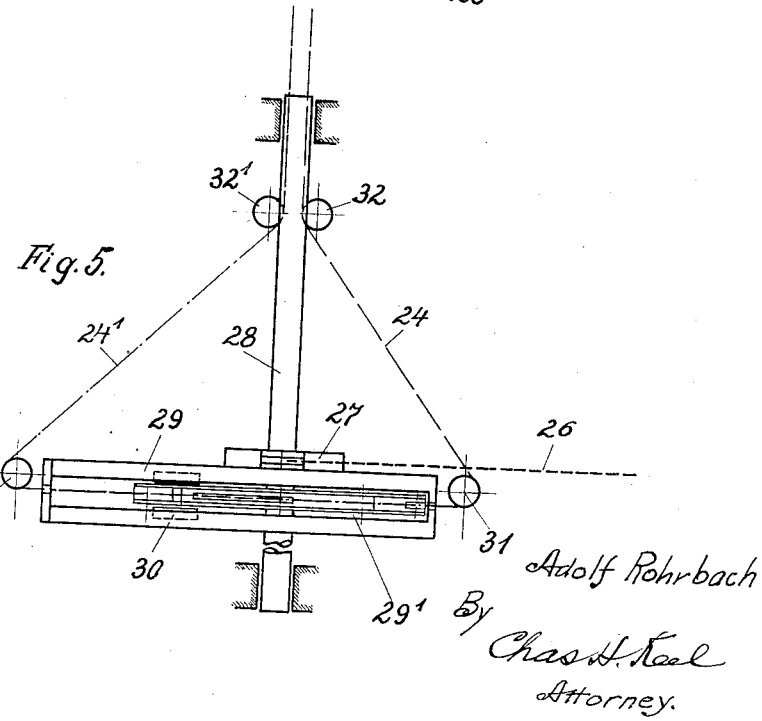

Patented Feb. 21, 1928.

1,659,961

UNITED STATES PATENT OFFICE.

ADOLF ROHRBACH, OF BERLIN-WILMERSDORF, GERMANY.

AIRCRAFT.

Application filed November 7, 1925, Serial No. 67,478, and in Germany December 2, 1924.

My application Ser. No. 725,834, filed July 14, 1924, relates to an aircraft which is provided with an auxiliary rudder or vane following the direction of the free air flow and controlling, without the influence of normal control processes caused either by the pilot or by automatically working devices, a mechanism for the prevention of too large angles of incidence shortly before they are reached. The specification, by way of example, deals with a stabilizing surface or fin, which is turnably arranged on the aircraft and coupled on one side with the auxiliary rudder or vane and on the other with the elevator, and to which is imparted with a certain angle of incidence against the path of flight such setting that the effect of the elevator is counteracted.

In accordance with the following invention the device for the prevention of too large angles of incidence of the wings, actuated by the auxiliary rudder placed free in the airflow consists of the elevator on which an influence is exerted by pressing. The improvement has the advantage of saving a turnably arranged auxiliary surface, so that the whole fitting of the safety device is extremely simple.

An embodiment of the invention is shown, by way of example, in the following drawings, wherein Figs. 1 and 2 are a plan view of the airplane and a view in side elevation respectively, and Figs. 3–5 are detail views in front view, section on line 4—4 of Fig. 3, and plan view respectively.

1 denotes the elevator, and 2 a stabilizer or horizontal fin of an aircraft, the elevator and stabilizer being carried in the particular embodiment shown by the vertical fin. 3 is the auxiliary rudder or vane, following the free airflow in the particular embodiment shown; it forms a part of the trailing edge of the wing 23. Control cables 24, $24^1$ lead from the auxiliary rudder or vane to a device for compensating and effecting the control movements which is arranged within the fuselage.

The compensating device consists of a novel coupling connected to those members which, transmitting the control movements, lead from the elevator 1 to control column 25. The cables 26, $26^1$ from the pilot's control stick act on arms 27, $27^1$, which are preferably rigidly connected with a pivot axle 28. A bottom part 29 of the levers 27, $27^1$, contains a sliding block 30, to which the cables 24, $24^1$ running to the auxiliary rudder are fixed. These cables run over pulleys 31, $31^1$ of the foot part 29, and over further pulleys 32, $32^1$, arranged on the axis 28, into a central lightening space of the axle.

The sliding block 30 is, by means of rods 33, in connection with a pair of hinged shears 34, the bearing of which is turnably arranged on the axis 28 in a cut-out $29^1$ of the foot part 29. The arms of the shears are of unequal lengths, so that with a contraction of the shears into the dotted position the end hinges 35, $35^1$, following a curved path, travel sideways into the positions $35^0$, $35^{10}$. To the end hinges 35, $35^1$ the control cables 36, $36^1$ leading to the elevator 1, are attached, these cables acting on the elevator by means of the segment lever 37, connecting rod 38, and lever 29.

The control operation in flight and during the moment of danger is as follows:—

If the pilot pulls the control column 25 to a normal flying position towards himself, the controlling movements are transmitted by cables 26, $26^1$ to the lever arms 27, $27^1$, which lever arms are fixed to the axle 28, and accordingly turn the hinged shears 34 with them by the medium of the foot body 29, the block 30, and the rods 33, so that the control movements by means of the cables 36, $36^1$ connected to the shears, are transmitted to the elevator to vary the angle of incidence. The reverse conditions result from pushing the control column, i. e. if the control action of the stick produces a falling of the machine.

If now, by way of example, through excessive pulling of the elevator or through other circumstances, the angle of incidence of the wings approaches the permissible limit, the auxiliary rudder or vane following the wind or air stream of the flight, receives an upward setting with the result that the sliding block 30 by means of the cables 24, $24^1$ is moved from its former place in the direction of the arrow (Fig. 4) and that the hinged shears are contracted. The resulting removal of those points of attack 35, $35^1$ to $35^0$, $35^{10}$ of the control cables 36, $36^1$ brings about that the cables 36, $36^1$ are pulled in the direction of the feathered arrows, which are indicated in Fig. 4, that is, pulled in a manner to tend to return the elevator 1 to a safe position. If, however, the pilot wants to press or push his control stick, he is perfectly free to do so in spite of the compensating device, as the latter does not counteract this controlling movement. A stretching of the shears occurs again through the action of the auxiliary rudder or vane, if the airplane departs from the dangerous position.

The present invention, therefore, alters with the approach of the wings to an undesirably large and dangerous angle of incidence the kinematic connection between the elevator and pilot's control stick in such manner that the elevator cannot be pulled any further than up to that position in which for the permissible maximum angle of incidence such a compensation of the longitudinal moments acting on the aircraft, occurs, and that the machine permanently maintains its flight with the maximum angle of incidence. There is, therefore, no possibility for the pilot to raise the machine up to a still steeper angle by pulling the control stick, but he can at any moment give the elevator a flatter setting, so that the machine can then continue to fly with a smaller angle of incidence and a higher speed.

In order to ensure a maintaining of the flight with the largest permissible angle of incidence in the state of continuance, independently of the correct position of the control column 25, the kinematic connection between the elevator 1 and the auxiliary rudder 3, having in consequence of the influence of the airflow a certain position with each angle of incidence, must be such that the elevator and the auxiliary rudder or vane together, during the flight with the largest permissible angle of incidence, form a system of stability in regard to the outer airflow. Thus, in case that shortly before attaining the respective largest angle of incidence, due to a violent pulling of the control stick, the deflection of the elevator should have been greater than is consonant with the state of continuance with the largest angle of incidence, the elevator returns by itself, that is, under the influence of the airforces exercising an adjusting effect on the auxiliary rudder or vane 3, into the position which is in accordance with the compensation of all longitudinal moments with the largest possible angle of incidence.

All weights of the elevator 1, auxiliary rudder or vane 3, control column 25, and transmitting members of these parts must, of course, be so arranged, harmonized, or balanced by additional masses, that their relative positions cannot be changed by any mass-acceleration as a result of the position or movement of the aircraft.

In place of the described compensating device also other kinematic devices may be used, such as differential gears, or curved guides. The auxiliary rudder or vane can, of course, be formed by some other control surface arranged at any other suitable place of the aircraft, instead of forming part of the wing.

In order to ensure that said surface is actuated by the free airflow into the correct position according to each angle of incidence, it must be fitted at such place and in such manner on the airplane, that it is neither exposed to the slipstream of the propeller nor to other sources of unsteadiness, for instance, the radiator or other large bodies producing a resistance. But on the other hand, the auxiliary rudder or vane, if viewed in the longitudinal direction of the aircraft, should be fixed so close to the wing, or the vertical axis through the centre of gravity, that also in curving flights a correct adjustment is obtained.

In a more comprehensive sense of the invention, the aircraft is also provided with a locking mechanism or other barring devices, rendering it possible at any time for the pilot to lock the auxiliary rudder or controlling vane out of operation, so that he can then on purpose attain those large angles of incidence which normally are non-permissible and produce a falling movement (diving flights). As a locking device there can for instance be considered, a bolt which blocks the body 30 in its guide, the bolt being lead-sealed, so as to have the throw-out of the safety device under control. Such a device is indicated consisting of a bolt 40 tied to the part 29 by a holding chain 40' which bolt 40 may be inserted at will into the registering holes 41 and 42 provided in the members 29 and 30 respectively.

In the various positions of the aircraft within the permissible limit of the angle of incidence, the influence of the auxiliary rudder or vane upon the compensating device is to be avoided. This is easily possible by giving the rods 33 in the normal position of the shears a stretched-out position, so that only after a considerable collapse of rods and shears the shifting of the points of attachment 35, $35^1$ will be practically noticeable.

Claims:

1. In an aircraft, the combination of a control vane disposed in the direction of the free air flow, a longitudinal control mechanism including a movable elevator, a control member directly operable by the pilot for actuating said elevator and means under the control of said vane for opposing the operation of the elevator by the pilot upon approaching unduly large angles of incidence.

2. In an aircraft the combination of a control vane disposed in the direction of the free air flow and responsive to changes in angles of incidence of the craft, an elevator for controlling the angle of incidence of the craft, a control member, a compensating device between said control member and said elevator and means connecting said vane with said compensating device.

3. An aircraft of the character set forth in claim 2 wherein the compensating device controlled by the vane upon the attainment of a maximum angle of incidence includes a compensating coupling preventing movement of the elevator beyond a predetermined value.

4. An aircraft of the character set forth in claim 2 in which the compensating device includes two positively coupled systems of two armed levers turnable about a common axis, one of the systems having rigid arms connected with the control member and the other system consisting of unequal arms which are connected with the elevator and with the controlling vane in a manner such that the movements of the latter produce a shortening effect upon said other system with the longitudinal shifting of the transmitting connections of the elevator.

5. An aircraft of the character set forth in claim 2 wherein the compensating device includes a system of contractible and distensible levers with means connected with the vane for contracting and distending said levers.

6. In an aircraft, the combination of a control vane following the direction of the free air flow and responsive to changes in angles of incidence of the craft, an elevator for controlling the angle of incidence of the craft, a control member therefor, a distensible and contractible system of levers interposed in the connections from said control member to said elevator, a reciprocable device for contracting and distending said levers and means connecting said reciprocable device with the vane.

7. An aircraft of the character set forth in claim 6 in which the connections between the vane and the reciprocable member run through a central cut-out of the axle carrying the distensible and contractible lever system.

8. In an aircraft of the character set forth in claim 2 wherein the compensating device includes a direct actuating mechanism between the elevator and the vane.

9. In an aircraft of the character set forth in claim 2 wherein the compensating device and the connecting means between said device and the vane include connections permitting normal variations in the angle of incidence without effecting any substantial compensating effect upon the elevator.

10. An aircraft of the character set forth in claim 2 in which the compensating device includes a rockable shaft and adjustable arms which are interconnected with the elevator and with the controlling vane in a manner such that the movements of the latter produce a longitudinal shifting of the transmitting connections of the elevator.

11. An aircraft of the character set forth in claim 2 in which the compensating device includes oscillatable distortable levers which are interconnected with the elevator and with the controlling vane in a manner such that the movements of the latter produce a lifting effect on the control member upon the elevator.

12. In an aircraft, the combination of a control vane disposed in the direction of the free air flow, a longitudinal control mechanism including a movable elevator, a control member for actioning said elevator and means under the control of said vane for opposing the operation of the elevator by the said control member upon approaching unduly large angles of incidence.

13. In an aircraft the combination of a controlling vane disposed in the direction of the free air flow, a longitudinal control mechanism for controlling the elevation of the craft, and means under the control of the vane for opposing the longitudinal control and preventing unduly large angles of incidence, said controlling vane forming a part of the wing.

14. In an aircraft the combination of a controlling vane disposed in the direction of the free air flow, a longitudinal control mechanism for controlling the elevation of the craft, means under the control of the vane for opposing the longitudinal control and preventing unduly large angles of incidence, and means under the control of the operator for neutralizing the effect of the vane upon the longitudinal control mechanism.

15. In an aircraft the combination of a controlling vane disposed in the direction of the free air flow, a longitudinal control mechanism for controlling the elevation of the craft, means under the control of the vane for opposing the longitudinal control and preventing unduly large angles of incidence, and a mechanism associated with the vane for locking the same out of operation at will.

In testimony whereof, I have signed my name to this specification.

Dr. ADOLF ROHRBACH.